United States Patent
Tillotson

(10) Patent No.: US 7,139,258 B2
(45) Date of Patent: Nov. 21, 2006

(54) TDMA BACKBONE FOR A MOBILE NETWORK

(75) Inventor: Brian Jay Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 938 days.

(21) Appl. No.: 10/091,672

(22) Filed: Mar. 5, 2002

(65) Prior Publication Data
US 2003/0169721 A1  Sep. 11, 2003

(51) Int. Cl.
*H04B 7/212* (2006.01)
*H04B 7/185* (2006.01)
*H04J 3/06* (2006.01)

(52) U.S. Cl. ............... 370/337; 370/347; 370/350; 370/519; 455/13.3

(58) Field of Classification Search ............... 370/314, 370/316, 321, 326, 337, 347, 442, 329, 331, 370/341, 350, 503, 508, 519; 455/13.3
See application file for complete search history.

(56) References Cited

U.S. PATENT DOCUMENTS

| | | | | |
|---|---|---|---|---|
| 3,789,142 A | * | 1/1974 | Shimasaki et al. | 370/323 |
| 4,090,036 A | * | 5/1978 | Stott et al. | 370/316 |
| 4,792,963 A | * | 12/1988 | Campanella et al. | 375/358 |
| 5,515,366 A | * | 5/1996 | Chieu et al. | 370/347 |
| 5,678,184 A | * | 10/1997 | Cutler et al. | 455/436 |
| 5,790,070 A | * | 8/1998 | Natarajan et al. | 342/354 |
| 5,907,809 A | | 5/1999 | Molnar et al. | |
| 6,246,874 B1 | * | 6/2001 | Voce | 455/428 |
| 6,339,707 B1 | | 1/2002 | Wainfan et al. | |
| 2002/0067709 A1 | * | 6/2002 | Yamada et al. | 370/337 |
| 2003/0193919 A1 | * | 10/2003 | Cain et al. | 370/337 |

FOREIGN PATENT DOCUMENTS

| | | |
|---|---|---|
| EP | 0 540 387 A2 | 10/1992 |
| EP | 0 571 740 A1 | 3/1993 |
| EP | 0 540 387 | 5/1993 |
| EP | 0 837 567 A2 | 10/1997 |
| EP | 0 837 567 | 4/1998 |
| EP | 1 059 773 A2 | 1/2000 |
| EP | 1 059 773 | 12/2000 |
| WO | WO 9408405 A1 * | 4/1994 |

OTHER PUBLICATIONS

Daniel Lihui Gu, Henry Ly, Xiaoyan Hong, Mario Gerla, Guangyu Pei and Yeng-Zhong Lee, 2000, "C-ICAMA, A Centralized Intelligent Channel Assigned Multiple Access for Multi-Layer Ad-Hoc Wireless Networks with UAVs", pp. 879-884.

(Continued)

*Primary Examiner*—Chau Nguyen
*Assistant Examiner*—Kerri Dyke
(74) *Attorney, Agent, or Firm*—Harness Dickey & Pierce P.L.C.

(57) ABSTRACT

An apparatus and method for a time division multiple access (TDMA) network backbone comprising a plurality of nodes interconnected by links. Each node has receive antennas and transmit antennas for communicating radio frequency (RF) bursts, and a node control for communicating node information. The receive antennas are operated in accordance with TDMA receiving slots and the transmit antennas are operated in accordance with TDMA transmit slots. A timing reference subsystem provides timing signals for the nodes for efficiently utilizing the transmission links formed between given nodes.

20 Claims, 7 Drawing Sheets

OTHER PUBLICATIONS

PCT Application, PCT International Application No. 03/04812 dated Feb. 13, 2003.

Publication entitled "C-ICAMA, a centralized intelligent channel assigned multiple access for multi-layer ad-hoc wireless networks with UAVs"; by Daniel Lihui Gu et al; vol. 2, Sep. 23, 2000, pp. 879-894, XP010532368 the whole document.

WO 01 28170 A (Beyer, David A; Fullmer Chane L (US); Garcia Luna Aceves J Joaquin) Apr. 19, 2001; p. 1, line 13-line 20; p. 8, line 27—p. 11, line 15, figures 1,4.

WO 99 56408 A (Hughes Electronics Corp) Nov. 4, 1999.

Publication entitled "Crosslink Architectures For a Multiple Satellite System" proceedings of the IEEE, IEEE. New York,; vol. 75, No. 1, Jan. 1987; pp. 74-81, XP000809622; ISSN: 0018-9219; the whole document.

* cited by examiner

Example Edit Rule – Avoid Consecutive Bursts

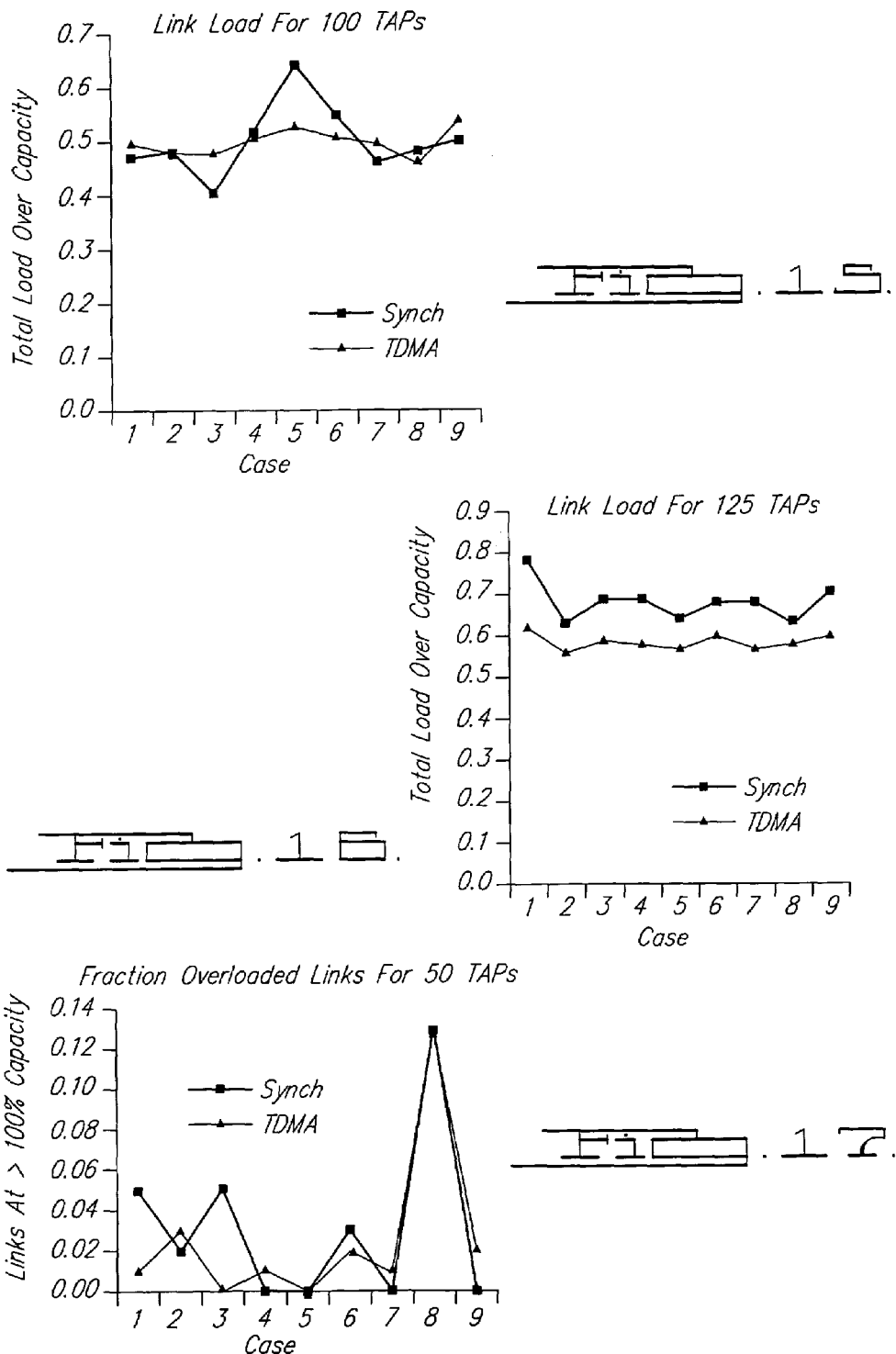

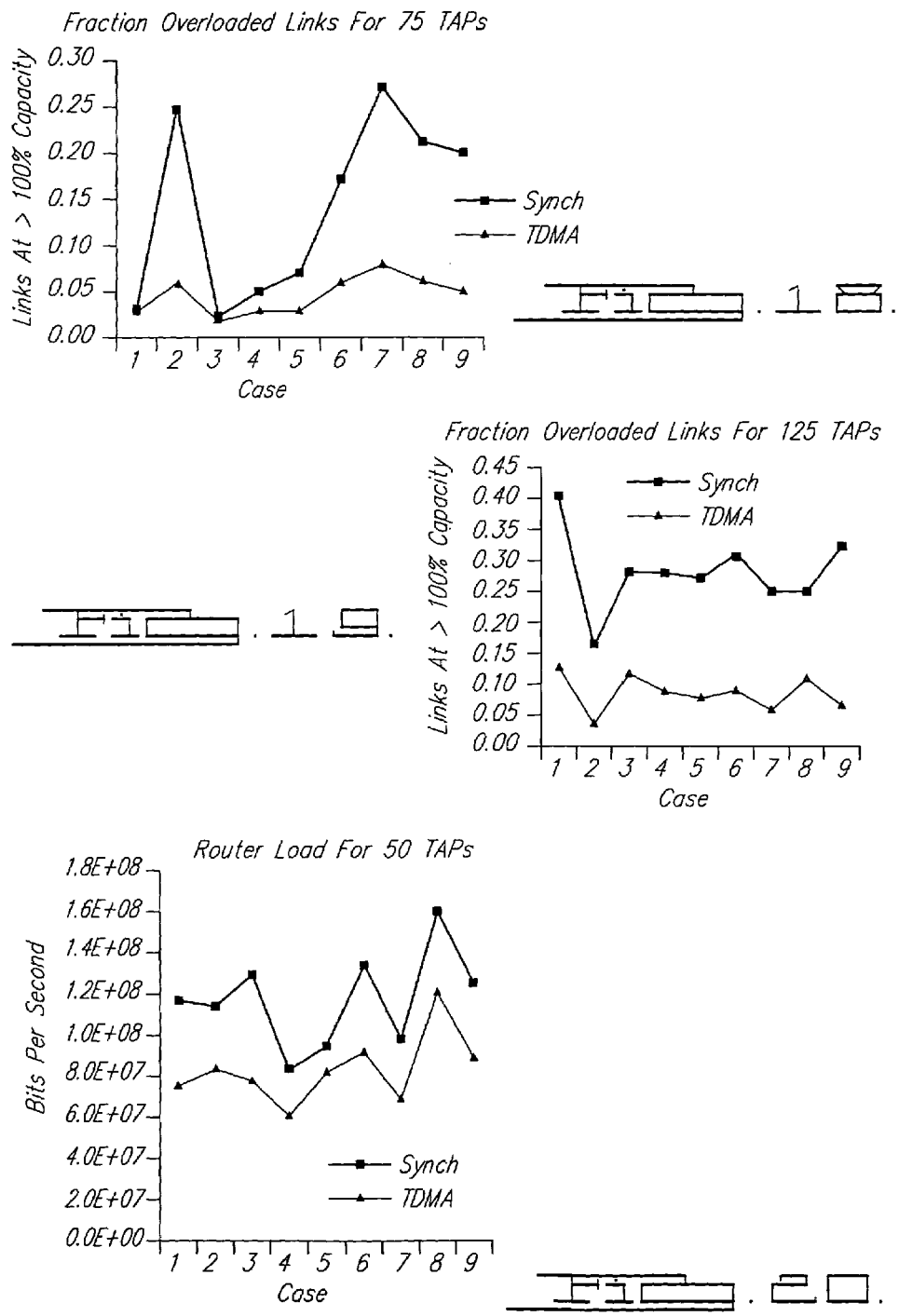

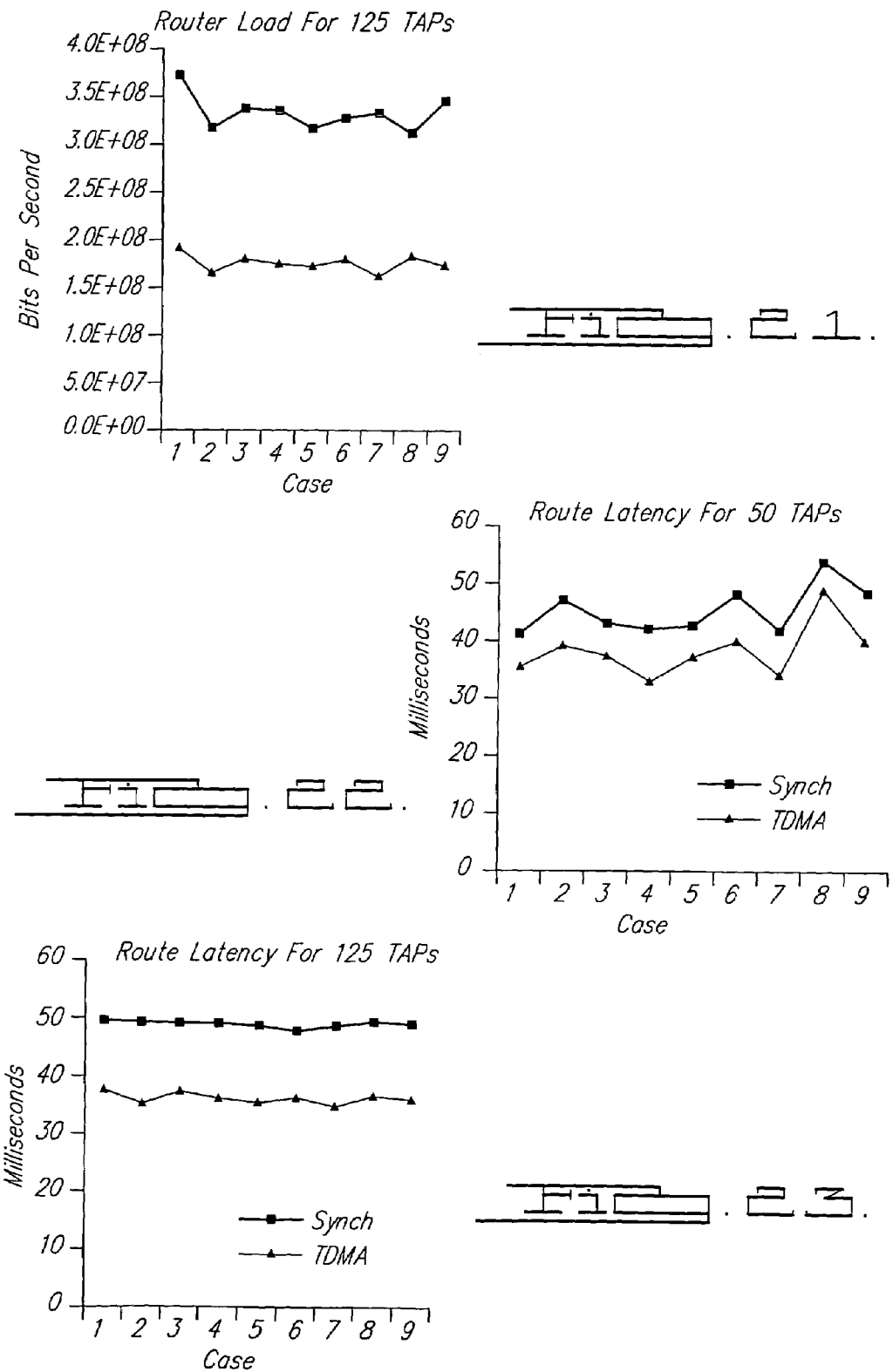

TDMA BACKBONE FOR A MOBILE NETWORK

FIELD OF THE INVENTION

The present invention relates to communication networks and, more particularly, to mobile communication networks.

BACKGROUND OF THE INVENTION

The effectiveness of a communication network depends essentially on its network architecture, components and operating conditions. Antennas are critical components in a mobile communication network. A properly chosen antenna can significantly enhance the performance of a mobile communication network.

A phased array antenna (PAA) employs spatially narrow radio frequency (RF) beams to communicate between the network nodes. Electronic beam steering allows the PAA beams to be retargeted instantly after a gap of minimum set-up time for loading the PAA shift registers. In a synchronous link approach the transmit beam of a first PAA is pointed towards the receive beam of a second PAA. Similarly, the transmit beam of the second PAA is pointed towards the receive beam of the first PAA. In the synchronous approach, each node having PAAs can form no more links than the number of beams on its PAAs. Consequently, the network's performance is limited by the number of beams on the PAAs.

Simulations of typical PAA based networks show that for a given spatial distribution of the nodes, the number of links actually available is much smaller than the maximum number of available links. This results in the average packet route going through several node hops, which is very inefficient. Adding more PAAs imposes increased demands of weight, power and physical space. Increasing the number of beams per PAA results in higher cost and thermal load per unit. Therefore, there is a need to implement a PAA based efficient network design.

Synchronous links can be used to implement a backbone of a network. In such an approach, the nodes on the backbone communicate among themselves using long-duration synchronous links. In real world networks, e.g., military networks, a single network backbone is connected to a number of terminal nodes. The backbone to terminal links use short bursts of RF energy in a time division multiple access (TDMA) approach. This requires the backbone nodes to have two sets of PAAs, one set to cover 4π steradian sky for maintaining continuous links to other backbone nodes, and another set to cover 4π steradian sky for TDMA links connecting to the terminal nodes. Two full sets of antennas make additional demands in terms of space, power and weight to accommodate the extra set of antennas. For military aircraft, such demands are prohibitive. Further, the mounting of extra antennas requires additional aircraft fuselage penetrations. Thus, there is a need for a network with a single set of PAAs to communicate with both the backbone and terminal nodes in the network.

In a synchronous link based backbone network, a group of terminal nodes communicating with the TDMA links cannot function as an independent network, i.e., a peer-to-peer network, without connecting to some backbone node. In military environments, a backbone node may not be accessible in some critical circumstances, making the network unavailable. Hence, there is a need for a PAA based network which will allow formation of a network made exclusively of terminal nodes.

SUMMARY OF THE INVENTION

The present invention is directed to a TDMA network backbone. In a preferred form the network backbone is constructed from nodes having interconnecting links. The nodes have a set of receive antennas and a set of transmit antennas. The receive antennas are operated in accordance with receiving slots of a TDMA sequence and the transmit antennas are operated in accordance with transmitting slots of a TDMA sequence. A timing reference subsystem provides timing signals to the nodes. A node control is used to communicate information related-to the nodes.

In one embodiment the transmit times are aligned to the boundaries of the transmit TDMA slots. In another embodiment the receive times are aligned to the boundaries of the TDMA receive slots. In one embodiment the receive and transmit antennas comprise phased array antennas.

In a preferred embodiment the links are formed by a given first node sending an order-wire message using the node control to a given second node. The node control on the first node computes the time-of-flight (TOF) for transmission from the first node to the second node. The first node sends an order-wire message to the second node offering first transmit slots and first receive slots. The second node intersects the first transmit slots with second receive slots on the second node to determine an acceptable transmit list. In a similar manner, the second node determines an acceptable receive list. The second node sends an acceptance status message along with the acceptable transmit and receive lists if the lists are non-empty, otherwise the second node sends a rejection status message. The transmission link between the first and the second node is made operative by the first node once the acceptance status message is received.

In one embodiment the capacity of the transmission link is adjusted by either removing or adding the receive and transmit slots associated with the transmission link.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIGS. 15 and 16 show an average link load;
FIGS. 17–19 show the fraction of individual overloaded links;

FIGS. 20 and 21 show an average processing load imposed on the nodes for a given amount of traffic; and FIGS. 22 and 23 show an average end-to-end route latency.

DETAILED DESCRIPTION OF THE PREFERRED EMBODIMENTS

The following description of the preferred embodiment(s) is merely exemplary in nature and is in no way intended to limit the invention, its application, or uses.

Figure 1:
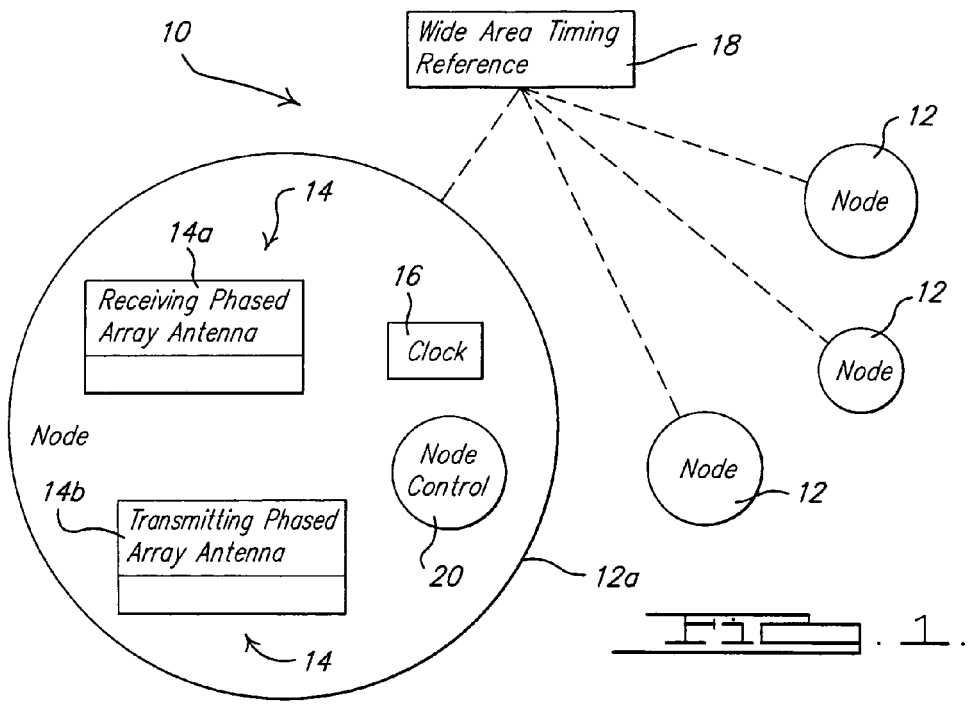
FIG. 1 is a block diagram of a PAA based network.

FIG. 1 shows a simplified block diagram of a network 10 in accordance with a preferred embodiment of the present invention. The network 10 consists of a plurality of nodes 12. The contents of one of the nodes 12*a* is also shown in FIG. 1. All the nodes 12 have preferably similar configurations. Node 12*a* has at least a pair of PAAs 14. A subset of the total number of PAAs 14 on the node 12*a* functions as receiving PAAs, while the other subset of the total number of PAAs 14 functions as transmitting PAAs. For explanatory purposes, the receiving PAA will be denoted by reference numeral 14*a* and the transmitting PAA by reference numeral 14*b*. Also, while the following description may reference node 12*a*, it will be appreciated that each of the nodes 12 operate in identical fashion to node 12*a*.

Each of the nodes 12 includes a clock 16 functioning as a backup timing device to be used when a wide area timing reference 18 is unavailable. The wide area timing reference 18 provides timing signals for synchronizing inter-node communications. A variety of different types of wide area timing references 18 can be used. For example, the network 10 preferably uses a global positioning system (GPS) as the wide area timing reference 18.

The backbone of the network 10 is a set of links among the nodes 12. For using such links any of the nodes 12 must find the other nodes 12 located within its line-of-sight and the transmit frequencies used by each of them. A node control 20, located on each of the nodes 12, sends information about the existence, location and transmit frequencies of the one node 12 to the other nodes 12. The node control 20 also receives similar information from the other nodes 12.

The node control 20 is used by the node 12 to send order-wire messages to the other nodes 12 requesting formation of a link. The node control 20 includes an algorithm to select one or more available frequency bands for transmission. For example, the node control 20 can use an algorithm that considers the bands used by the nearby nodes 12 and then selects the frequency band whose nearest user is farthest from the node 12 implementing the algorithm. Thereafter, the node control 20 uses a second algorithm to select one of the other nodes 12 in an attempt to form a link. For example, the second algorithm computes the range to each one of the other nodes 12 and selects the closest of those other nodes 12. Once the node control 20 selects a particular other node 12, the link formation process can be started. Those skilled in the art will appreciate that the invention is not limited by the type of the algorithm used for selecting the frequency bands for transmission.

Figure 2:
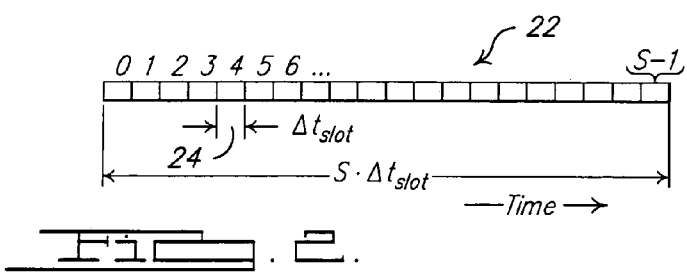
FIG. 2 is a shows a representation of a TDMA cycle.

FIG. 2 shows a representation of a TDMA cycle 22. The TDMA cycle 22 consists of "S" number of time slots 24 numbered from 0 to S−1. The length of each slot 24 is set to '$\Delta t_{slot}$,' which is equal to the duration of an RF burst plus a small guard interval to accommodate timing discrepancies between the slots 24. The duration of the overall TDMA cycle 22 is given by the product S×$\Delta t_{slot}$. Wide area timing reference 18 (as shown in FIG. 1) is used to align the slots 24. For example, if the duration of $\Delta t_{slot}$ is 100 microseconds and there are 100 slots 24, then the overall duration of the TDMA cycle 22 is 0.01 second.

The node 12*a* uses the node control 20 to determine its location. The location is determined within a fraction of the distance that an RF burst covers in duration length of the one slot 24. The given node 12*a* calculates the time-of-flight (TOF) to another node 12 after determining the location of the other node 12. As the locations for the nodes 12 are imprecisely known, each of the slots 24 includes a guard interval. The guard interval prevents successive RF bursts received by the adjoining slots 24 from overlapping each other. The length of the guard interval must be large if the locations of the nodes 12 are known less precisely. If the guard interval is made too long then the length of the slot 24 will also increase, resulting in a loss of efficiency.

Either the transmit times or the receive times are aligned on the boundaries of the slots 24, but not both. For example, if the transmit times are aligned on the boundaries of the slots 24, then every node 12 will transmit RF bursts at the same time, but the RF bursts would be received at different times depending on the time-of-flight (TOF). Similarly, the network 10 can be configured so that the receive times are aligned on the boundaries of the slots 24. Those skilled in the art will readily appreciate that choosing either alignment is equally effective, and the invention is not limited in any manner by such a choice.

Figure 3:
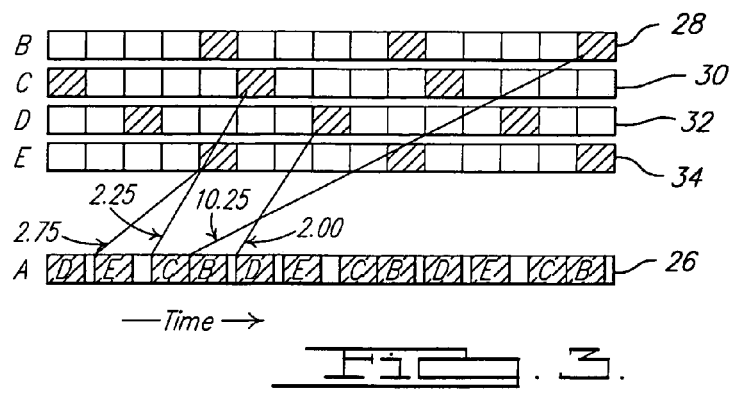
FIG. 3 illustrates a sending mechanism.

FIG. 3 illustrates the sending protocol. The following discussion assumes that a choice has been made to align the receive times on the boundaries of the slots 24. A node "A" designated by reference numeral 26, transmits RF bursts to a node "B," designated by numeral 28, node C, designated by numeral 30, node D, designated by numeral 32 and node E, designated by numeral 34. Distances between the node A 26, which is transmitting, and the other nodes 12 varies depending on the TOF and is measured in the multiples of duration length of the slot 24. For example, node A 26 is at a distance of 10.25 slots from node B, indicating a TOF 10.25 times longer than the length of the single slot 24. Node A 26 starts transmitting to Node B 28 before a scheduled receive time for node B 28. The time by which transmission of node A 26 precedes the scheduled receive time for node B 28 is equal to the TOF between node A 26 and node B 28, which is 10.25 slots. Similarly, node A 26 will start transmitting to node C 30, node D 32 and node E 34 before the scheduled receive times for those slots. As the receive times are aligned to the slot boundaries, node B 28, node C 30, node D 32 and node E 34 receive RF bursts at the appropriate slot boundary depending upon their respective TOFs from node A 26.

Figure 4:
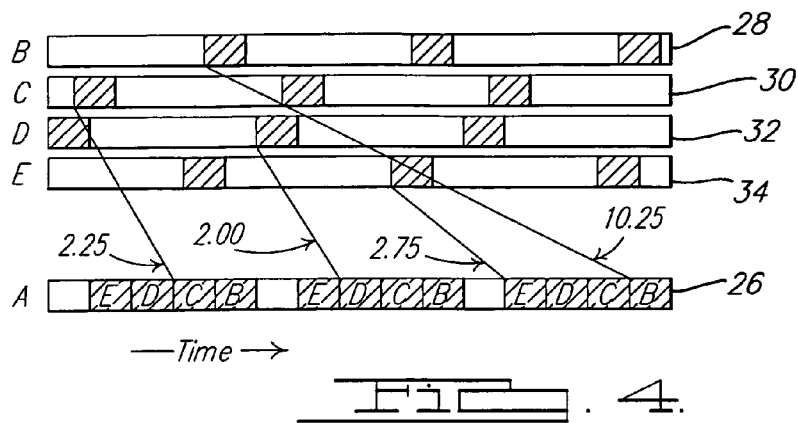
FIG. 4 illustrates a receiving mechanism.

FIG. 4 illustrates the receiving protocol. Here, node B 28, node C 30, node D 32 and node E 34 transmit towards node A 26. Node A 26 expects to receive RF bursts at well aligned receive times. Node B 28, node C 30, node D 32 and node E 34 transmit towards node A 26 typically at non-aligned times; these nodes start transmitting at times equal to the TOF before the scheduled receive slot for node A 26.

Figure 5:
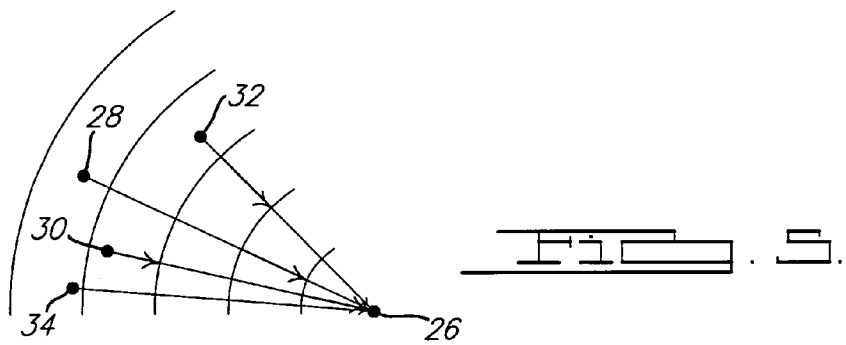
FIG. 5 shows a spatial representation of a transmission.

FIG. 5 shows a spatial representation of a burst received by node A 26. Node B 28, node C 30, node D 32 and node E 34 transmit towards node A 26 at varied times depending upon the TOF between each particular one of these nodes and the receiving node A 26. The bursts are spaced to arrive at successive and non-overlapping times which are aligned to the specific time slots 24.

Figure 6:
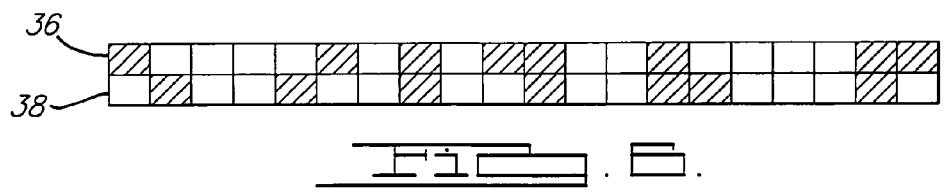
FIG. 6 illustrates a link formation process.

FIG. 6 illustrates an offered transmit slots block 36 and an offered receive slots block 38.

Figure 7:
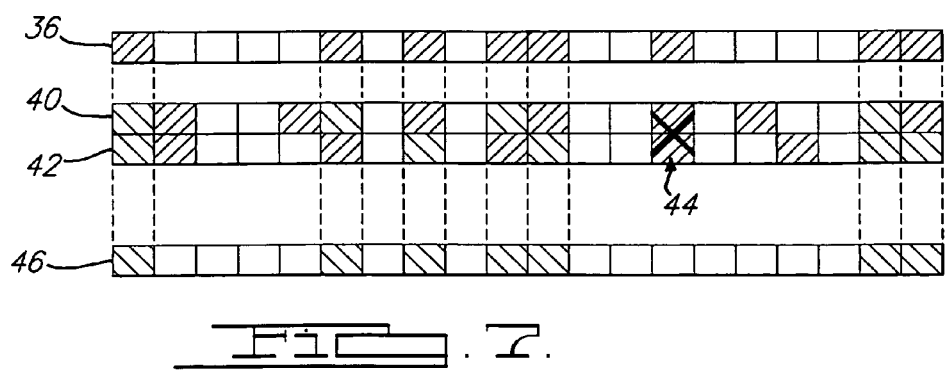
FIG. 7 illustrates a receive block processing mechanism.
Figure 8:
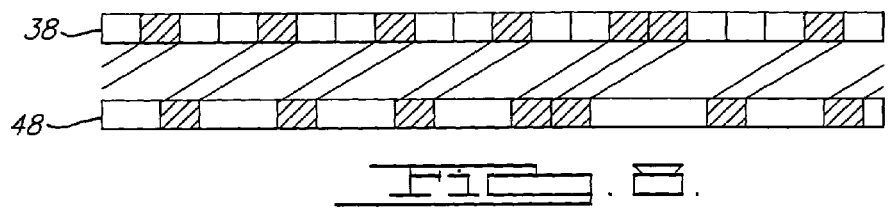
FIG. 8 illustrates the calculating of send times.
Figure 9:
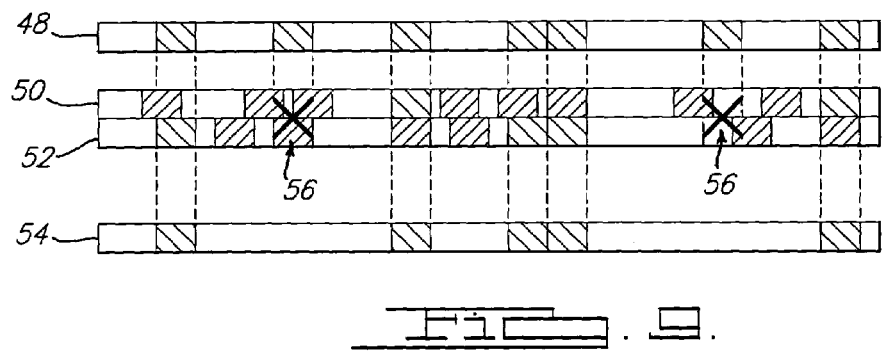
FIG. 9 illustrates a transmit block processing mechanism.

Referring to FIGS. 7–9, the operation of the receive block processing protocol, together with the calculation of send times and the operation of the transmit block processing protocol will be described. For illustrating the link formation process, node A 26 and node B 28 (refer to FIG. 5) are considered as examples described below. Node A 26 identifies the transmitting PAA 14b that points closest towards node B 28 using the locations of node A 26 and node B 28 along with the orientation of node A 26. Node A 26 calculates the TOF using the locations of nodes A 26 and B 28.

Node A 26 calculates the start times for sending bursts from node A 26 in order to transmit to node B 28 by subtracting the TOF from the starting time of the slot 24. Node A 26 thus builds a list of start times for sending bursts from node A 26 to node B 28. Node A 26 determines which of the available intervals on the array of transmit PAA 14b are previously unassigned and hence available for transmitting bursts to node B 28. Node A 26 puts the available slot 24 indicator on the offered transmit slots block 36 (FIG. 7) to node B 28 if for each interval at least one of the beams of transmit PAA 14b is not already assigned to any of the links with the other nodes 12. The available slot 24 indicator corresponds to the receive slot 24 during which node B 28 would receive the possible burst.

Node A 26 determines the slots 24 on the receive array of its PAAs which are available for receiving RF bursts from node B 28. Node A 26 determines, for each of the 'S' number of the slots 24, whether at least one of the beams of the receiving PAA 14a is not previously assigned to links with the other nodes 12, then the node A 26 puts the identifier for that slot 24 on the offered receive slots block 38 (FIG. 8) to be offered to node B 28.

Node A 26 sends an orderwire message to node B 28 tendering offered transmit slots block 36 and the offered receive slots block 38. The offered transmit slots block 36 indicates times at which node A 26 could transmit bursts from node A 26. The offered receive slots block 38 indicates the times at which node A 26 has the capacity to receive bursts from the node B 28.

Node B 28 then analyzes the orderwire request sent by node A 26. Node B 28 determines which of its receiving PAA 14a is pointing closest to node A 26, and which of the slots 24 are available for its receiving PAA 14a to receive bursts from node A 26.

With further reference to FIG. 7, node B 28 intersects the available receive slots 24 and the available transmit slots 24 from node A 26. First, the intersection process for receiving slots 24 will be discussed. For illustration purposes, the receiving PAAs 14a located on node B 28 have two beams, i.e., a first receive beam 40 and a second receive beam 42. Node B 28 intersects the offered transmit slots block 36 received from node A 26 to the slots 24 for the first receive beam 40 and a second receive beam 42. Node B 28 accepts those transmit slots from offered transmit slots block 36 for which the receive slot 24 is available on either the first receive beam 40 or a second receive beam 42 or both of them, and such acceptable slots 24 are put on a physically acceptable receive list 46. Those slots on the offered transmit slots block 36 for which both the first receive beam 40 and the second receive beam 42 are unavailable are ignored as unavailable receive slots 44 and hence are not reflected on the physically acceptable receive list 46.

Secondly, node B 28 carries out the intersection process for the transmitting slots 24, node B 28 determines which of its transmitting PAAs 14b is closest to node A 26 and then computes the TOF from itself to node A 26. Referring to FIG. 8, node B 28 computes start times corresponding to each of the slots 24 on the offered receive slots block 38 to create a send times block 48. Node B intersects the send times block 48 with a first transmit beam 50 and second transmit beam 52, as indicated in FIG. 9. Node B 28 accepts those slots 24 from send times block 48 for which the transmit slot 24 is available on either the first transmit beam 50 or second transmit beam 52, or on both of them, and such acceptable receive slots 24 are put on a physically acceptable transmit list 54. For those slots on the send times block 48 for which both the first transmit beam 50 and second transmit beam 52 are unavailable, they are ignored as unavailable transmit slots 56 and not reflected on the physically acceptable transmit list 54.

Figure 10:
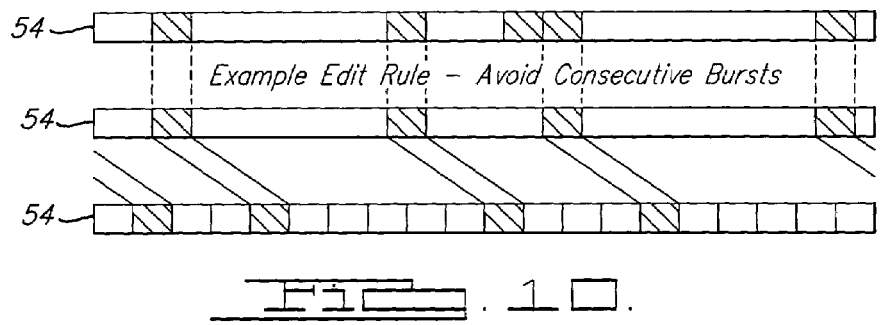
FIG. 10 illustrates a user defined rule applied to physically acceptable lists.

FIG. 10 illustrates a user defined rule applied to physically acceptable lists. Node B applies any user defined rules to physically acceptable receive list 46 and the physically acceptable transmit list 54. The user defined rule illustrated in FIG. 10 is termed as "avoid consecutive bursts", which is used to edit the physically acceptable transmit list 54. As shown in FIG. 10, the physically acceptable transmit list 54 is edited to remove consecutive bursts as per the user defined rule. Similar rules can be used for the physically acceptable receive list 46.

Node B 28 sends an acceptance message to node A 26 with the selected receive and transmit slots 24. Node B 28 sends the acceptance message only if at least one slot 24 remains in each of the receive and transmit lists and the link meets any user specified criteria, otherwise it sends a rejection message to node A 26. If the proposed link was accepted by node B 28, then node A 26 and node B 28 point their respective receiving PAAs 14a and transmitting PAAs 14b at each other at agreed upon times and also begin transmitting to each other at agreed on upon times. Thus, a link is formed between node A 26 and node B 28. In order to maintain the link, node A 26 and node B 28 intermittently receive updated location information from each other, based on which node A 26 and node B 28 adjust their beam pointing and burst timing.

In case node A 26 does not receive a response from node B 28, then node A 26 repeats the process a given number of times before abandoning the attempt to form a link with node B 28. After abandoning attempts to form a link with node B 28, node A 26 attempts to form links with the other nodes 12. If node B 28 does not receive any scheduled bursts within a user-defined interval after sending an acceptance message to node A 26, then node B 28 retransmits the acceptance message a user-defined number of times. Node B 28 abandons the link if node A 26 fails to transmit even after node B 28 retransmits the acceptance message a user-defined number of times.

The TDMA backbone approach allows the nodes 12 to adjust capacity of each link to match the demand for data traffic. The link capacity is effectively boosted to carry more data over an existing link. For illustrating the process of increasing the capacity of a link, the link between node A 26 and node B 28 is considered. Node A 26 estimates the number of additional slots 24 which need to be added to the TDMA cycle 22 for additional capacity. For example, if node A 26 needs to transmit an additional 1 million bits per second and each burst carries 10,000 bits, then node A 26 would need to add 100 bursts per second to the link. If the duration of the TDMA cycle 22 is 100 milliseconds, then there are ten TDMA cycles 22 per second. Hence, to add 100 bursts per second would mean adding 10 bursts per TDMA cycle 22. Thus, the number of slots 24 that need to be added for additional capacity is 10 more slots 24 per TDMA cycle 22.

Node A 26 subtracts the TOF from the starting time for each slot 24 in the TDMA cycle 22 using the already known TOF for transmissions to node B 28. The result is a send times block 48. Using the already known physically acceptable transmit list 54, node A 26 determines which transmit intervals are available and accordingly updates the physically acceptable transmit list 54. Node A 26 sends a request for additional transmit capacity to node B 28, along with the number of additional slots that node A 26 would like to add and the list of physically acceptable transmit intervals. On receiving the message for additional capacity from node A 26, node B 28 determines which of the slots 24 are available on its receiving PAAs 14*a* to receive bursts from node A 26. Node B 28 computes the intersection of the available slots 24 on its receiving PAAs 14*a* and the slots 24 offered by node A 26. The result of such intersection is put on the physically acceptable receive list 46 for note B32. Node B 28 removes slots from the physically acceptable receive list 46 until the number of the slots 24 is not greater than the number of additional slots 24 required by node A 26.

Node B 28 sends a response to node A 26 with the selected additional slots 24 (possibly none). If node B 28 has responded with at least one additional slot 24, then node B 28 begins pointing its receiving PAAs 14*a* during the additional slot 24, and node A 26 begins transmitting to node B 28 at the agreed upon times. Thus, the additional capacity becomes operational. If node B 28 accepts a lesser number of slots 24 than those requested by node A 26, then node A 26 routes excess traffic via other links.

At certain times link capacity will be adjusted by removing excess capacity from the link. For illustrating the excess capacity reduction, the link between node A 26 and node B 28 is considered. Node A 26 estimates the number of receive slots 24 and the number of transmit slots 24 that can be removed from each of the TDMA cycles 22. For example, in one situation each burst carries 10,000 bits, and node A 26 estimates that the capacity of the link exceeds the demand by one million bits per second for the data transmitted to node B 28 and two million bits per second for the data received from node B 28. Node A 26 would then remove 100 bursts per second from node A 26 to node B 28 part of the link, and 200 bursts per second from the node B 28 to the node A 26 part of the link. If the duration of the TDMA cycle 22 is 100 milliseconds, then there will be 10 TDMA cycles 22 per second, which means removing 100 bursts per second equates to removing 10 bursts per TDMA cycle 22.

Node A 26 applies user defined criteria to select the slots 24 to be removed from the physically acceptable receive list 46 and the physically acceptable transmit list 54. For example, the user defined criteria could be to remove the slots 24 that are needed to meet demand on another link on the same PAA. Alternatively, the user defined criteria could be to specify a minimum number of the slots 24 per link, even when the link is lightly loaded, to maintain low latency. Node A 26 sends a message to node B 28 specifying which of the transmit and receive slots 24 are to be removed from the link. Node B 28 removes the specified slots 24 from the physically acceptable receive list 46 and the physically acceptable transmit list 54. Node B 28 then sends an acknowledgement to node A 26. Both node A 26 and node B 28 cease using the specified transmit slots 24, as well as the specified receive slots 24. Thus, node A 26 and node B 28 both are free to assign the removed transmit slots 24 and receive slots 24 to other links.

Network 10 typically operates in a mobile environment. Some of the nodes 12 will be in motion relative to other nodes 12. For example, as node A 26 and node B 28 move through the atmosphere, it is possible that node B 28 will move out from the field-of-regard of a first PAA 14 on node A 26 and into the field-of-regard of the second PAA 14 also located on node A 26. A conflict could possibly occur because the slots currently used for the link on first PAA 14 could already be assigned to other links on the second PAA 14.

Node A 26 and node B 28 take steps to avoid conflicts when a link transfers from one PAA 14 to another PAA 14. Node A 26 continuously tracks the angular position and angular rate of each link relative to the field-of-regard of a given PAA 14. Node A 26 continuously predicts when each link is likely to cross the edge of the field-of-regard for a given PAA 14. Node A 26 considers its own rotation and/or the position of node B 28, and estimates that typically within a few TDMA cycles 22 that node B 28 will be in the field-of-regard of the second PAA 14. Node A 26 identifies the available slots on the second PAA 14 and sends a list of the available slots 24 to node B 28 along with the estimated time at which node B 28 will be in the field-of-regard of the second PAA 14. Node B 28 identifies which of the offered slots 24 it can accept, using the intersection process described above. Node B 28 sends the list of accepted slots 24 to the node A 26. Node A 26 and node B 28 then start transmitting at agreed upon times using the newly agreed upon slots 24.

Figure 11:
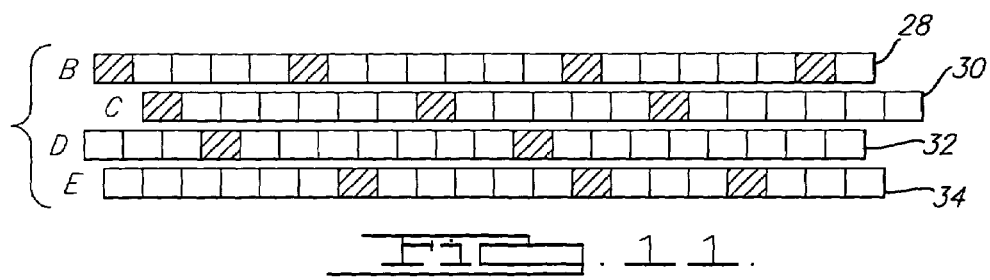
FIG. 11 illustrates non-overlapping bursts.
Figure 12:
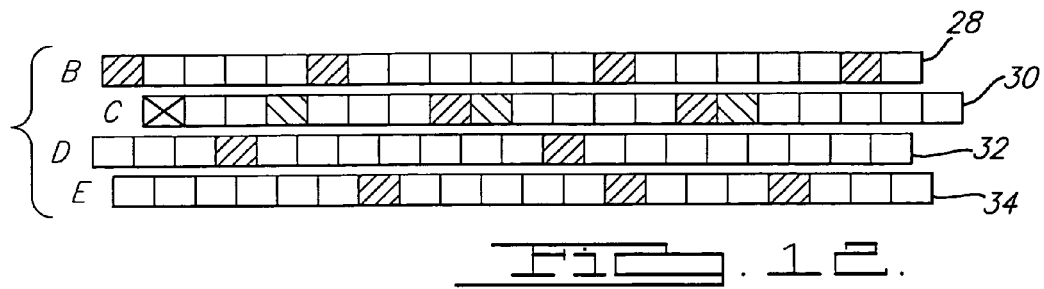
FIG. 12 illustrates overlapping bursts.

FIG. 11 illustrates non-overlapping bursts from node A 26 to node B 28, node C 30, node D 32 and node E 34. As the nodes move, the times of flight from node A 26 to the other nodes may vary at differing rates leading to overlap in the transmit intervals on different links. FIG. 12 illustrates overlapping bursts. Node A 26 must eliminate any overlapping burst, but it can maintain the link to node C 30 by adding a burst at any of the slots 24 filled with cross-hatchings in FIG. 12.

A special situation results when previously overlapping blocks become available "just-in-time." For example, referring to FIG. 11, the fourth block from the left in the link to node C 30 overlaps a block in transmission from node A 26 to node B 28. The fourth block from the left is therefore not available for transmissions from node A 26 to node C 30. But just when the leftmost block on the link to node C 30 (indicated by an "X")begins to overlap another transmission from node A 26 to node B 28, the fourth block from the left on the link to node C 30 which was previously overlapping ceases to overlap the transmission from the node A 26 to the node B 28. Thus, certain slots 24 which were previously locked in an overlap may become available "just-in-time" as the overlap pattern changes.

To overcome special situations resulting from changes in distances between nodes, the transmit intervals need to be reassigned. Node A 26 tracks the timing of transmit bursts in each link relative to bursts in other links on the same transmitting PAA 14*b*, while continuously predicting the likelihood of the bursts overlapping each other. Node A 26 estimates that the relative motion of node B 28 and node C 30 will put one or more bursts from node A 26 to node B 28 into conflict with the bursts from node A 26 to node C 30 within a span of a few TDMA cycles 22. Node A 26 identifies available slots on the array of the transmitting PAAs 14*b* which will become available when the conflict starts. Node A 26 sends the list of slots 24 that must be deleted to avoid overlaps and a list of available slots including the "just-in-time" available slots 24 to node C 30, along with the estimated time at which the changes must be made. Node C 30 identifies the slots 24 which it can accept using the intersection methods described above and sends the list of acceptable slots 24, if any, to node A 26. At agreed upon times, node A 26 and node C 30 cease to use the conflict causing slots 24 and start using the newly agreed upon slots 24.

Networks having a TDMA backbone generally perform better than conventional networks based on the synchronous approach. FIGS. 13–23 show graphs of simulations comparing the invention with the conventional synchronous approach. Nodes 12 in the network analyzed in the FIGS. 13–23 were distributed throughout a 2000 km×2000 km theatre of war, and the altitudes varied from sea level up to 10 km above sea level. All traffic was routed along the shortest path with a minimum number of hops. The 'TAP' acronym in the legend of these figures refers to 'TMIG Access Point' (TMIG stands for Theater Mobile Information Grid), which is equivalent to node 12, and further discussion will assume that they are similar.

Figure 13:
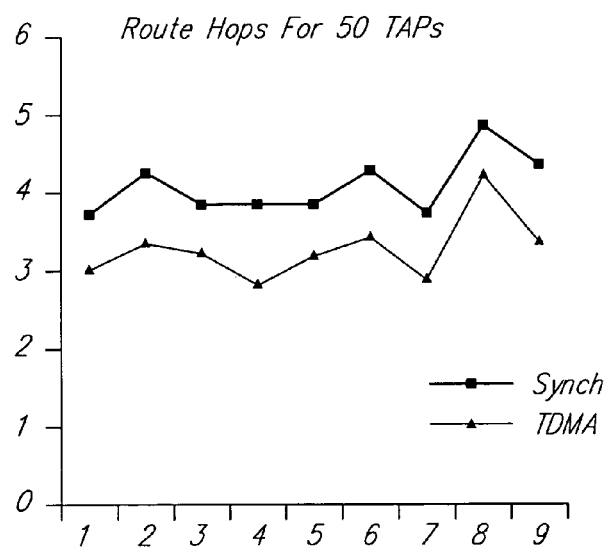
FIGS. 13 and 14 show the plot of an average number of node hops per end-to-end route.
Figure 14:
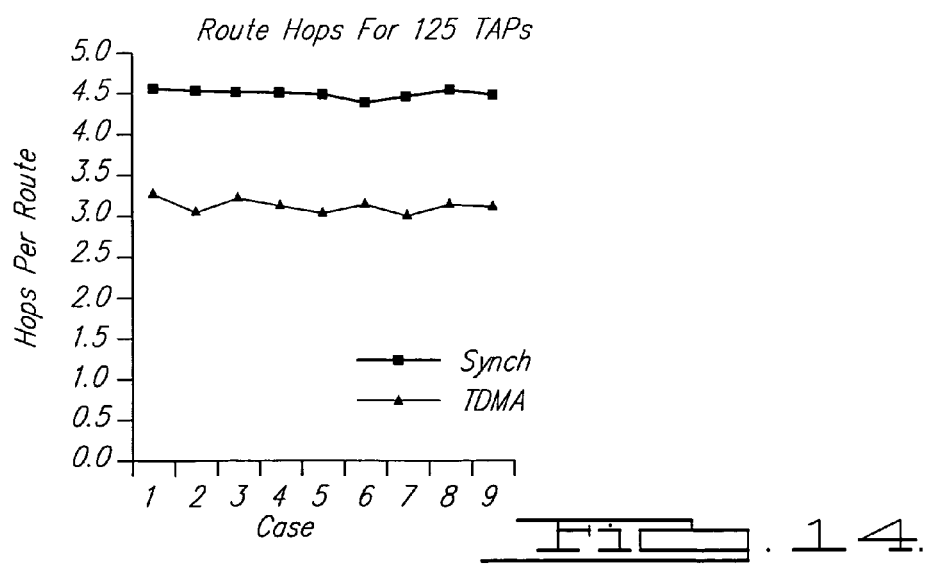

FIGS. 13 and 14 show the plot of the average number of transmission hops per end-to-end route for 50 and 125 nodes, respectively. A network with fewer hops tends to be more efficient. As illustrated, the TDMA backbone of the invention yields fewer hops regardless of the number of nodes in the network. The effectiveness of the invention increases as the number of nodes increases.

FIGS. 15 and 16 show the average link load, which is the amount of traffic carried over each link divided by the capacity of that link. The synchronous approach provides lower average loads for networks with few nodes. The invention and the synchronous approach provide comparable average loads at 75 to 100 nodes. The invention, at 125 or more nodes, imposes only about 85 percent of the load of a synchronous backbone.

FIGS. 17–19 show the fraction of individual overloaded links, i.e., the links for which the amount of traffic over the link exceeds the capacity of the link. The invention and the synchronous approach provide similar results for networks with 50 nodes. For 75 or more nodes the invention is superior in almost all cases over the synchronous approach. With 125 nodes, the number of overloaded links for the invention is only 29% as great as for the synchronous backbone. In real networks, as opposed to present simulations with least hops, routers tend to direct traffic around overloaded links. Synchronous links in real networks would have lesser overloaded links, but will have more hops. Thus, synchronous approach in real networks would suffer from increases in link loading, processing load and latency.

FIGS. 20 and 21 show the average processing load imposed on the nodes for a given amount of traffic. The invention provides a lower processing load in all cases and at all network sizes. As the number of nodes increases the invention provides even better processing load. For example, at 125 nodes the invention imposes only 53% of the processing load imposed by a synchronous backbone.

FIGS. 22 and 23 show the average end-to-end route latency. The invention provides lower latency in all cases and all network sizes. The invention provides even better performance as the number of nodes increases. For example, at 125 nodes, the latency with the invention is only 76% of the latency with a synchronous backbone.

As compared to conventional approaches, the present invention provides a lower cost mobile network by permitting a lower data rate per beam (i.e. lower modem speeds) and lower processing speed in each node (slower decryption, error correcting, and routing speed) to achieve the same end-to-end data rate. The invention also provides lower end-to-end latency than conventional approaches. The invention furthermore permits multiple nodes 12 to transmit simultaneously and does not require burst durations longer than the TOF. In addition, the invention permits a single set of PAAs covering 4π steradian sky on a network backbone node to provide network backbone communications together with TDMA links to terminal nodes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A time division multiple access (TDMA) based network backbone comprising:
    a plurality of nodes including a plurality of receive antennas for receiving a plurality of radio frequency (RF) bursts and a plurality of transmit antennas for transmitting said RF bursts, a duration of said RF bursts being shorter than a time of flight (TOF) between said nodes;
    a node control for communicating information relating to said nodes;
    a timing reference subsystem for providing timing signals to said nodes; and
    a plurality of links interconnecting said nodes,
    said receive antennas operated in accordance with a plurality of receiving slots and said transmit antennas operated in accordance with a plurality of transmitting slots.

2. The network backbone of claim 1, wherein said timing reference subsystem comprises a global positioning system.

3. The network backbone of claim 1, wherein transmitting times for said RF bursts are aligned to boundaries of said transmitting slots.

4. The network backbone of claim 1, wherein receiving times for said RF bursts are aligned to boundaries of said receiving slots.

5. The network backbone of claim 1, wherein a plurality of said nodes transmit simultaneously.

6. The network backbone of claim 1, wherein each of said nodes further comprises:
    a clock for providing backup timing signals.

7. A method of forming a time division multiple access (TDMA) based network backbone, the method comprising:
    sending an orderwire message from a first node selected from a plurality of nodes to other nodes of said plurality of nodes, said first node using a node control for sending said orderwire message to said other nodes;
    selecting a second node to form a link, said second node having a plurality of second transmit slots and a plurality of second receive slots;
    calculating time of flight (TOF) of a transmission from said first node to said second node at said second node using current locations of said first node and said second node;
    sending an orderwire message from said first node to said second node offering a plurality of first transmit slots and a plurality of first receive slots to said second node; and
    sending a status message from said second node to said first node.

8. The method of claim 7, further comprising the steps of:
    forming an acceptable receive list after comparing said first transmit slots with said second receive slots; and
    forming an acceptable transmit list after comparing said first receive slots with said second transmit slots.

9. The method of claim 8, wherein said status message comprises an acceptance message if said acceptable receive list and said acceptable transmit list are not empty, said acceptance message including said acceptable receive list and said acceptable transmit list.

10. The method of claim 8, wherein said status message comprises a rejection message if said acceptable receive list is empty.

11. The method of claim 8, wherein said status message comprises a rejection message if said acceptable transmit list is empty.

12. The method of claim 8, further comprising the step of:
applying a user defined rule to said acceptable receive list and said acceptable transmit list.

13. A method for communicating over a time division multiple access (TDMA) based network backbone, the method comprising:
determining a location for each one of a plurality of nodes, a plurality of each of said nodes including a node control for determining node location;
calculating a time of flight (TOF) between a sending node of said plurality of plurality of nodes, and a subplurality of receiving nodes of said plurality of nodes at the subplurality of receiving node of said plurality of nodes;
transmitting a plurality of radio frequency (RF) bursts from said sending node to said receiving nodes using a plurality of transmitting phased array antennas (PAAs) based on the calculated TOF, said transmitting PAAs operating in accordance with a plurality of transmitting slots; and
receiving a plurality of RF bursts from said sending node, using a plurality of receive PAAs, said receive PAAs operating in accordance with a plurality of receiving slots.

14. The method of claim 13, wherein said step of receiving is performed at times so as to be aligned with said receiving slots.

15. The method of claim 13, wherein said step of receiving is performed at times so as to be aligned with said transmitting slots.

16. The method of claim 13, further comprising the step of:
spacing the RF bursts to avoid overlapping one another.

17. The method of claim 13, wherein said step of transmitting further comprises:
managing transmission times so that a single said transmitting PAA is restricted from attempting to simultaneously transmit to any two of said nodes.

18. A method for dynamically adjusting link capacities for a time division multiple access (TDMA) network backbone, the method comprising:
estimating a needed modification in a total plurality of TDMA slots of a given transmission link for adjusting a link capacity of said given transmission link to accommodate a desired transmission link capacity;
sending a modification request from a first node of said given transmission link to a second node of said given transmission link;
updating a current status of said second node to accommodate a desired transmission link capacity by;
using said first node to estimate a plurality of transmit TDMA slots and a plurality of receive TDMA slots to be removed to reduce link capacity;
selecting said transmit TDMA slots and said receive TDMA slots to be removed by said first node based on a user-defined criteria; and
sending to said second node a request for removing certain of said transmit TDMA slots and certain of said receive TDMA slots; and
sending a status message from said second node to said first node.

19. The method of claim 18, wherein said step of updating a current status, comprises:
constructing a send times block by said first node for determining starting times for transmissions from said first node to said second node;
updating a physically acceptable transmit list for additional required TDMA slots on said first node;
sending a request to said second node for additional transmit capacity along with updated said physically acceptable transmit list;
constructing a physically acceptable receive list from a comparison of a plurality of available receive TDMA slots on said second node with said physically acceptable transmit list;
truncating said acceptable receive list to match said request for additional transmit capacity;
sending said acceptable receive list to said first node; and
using additional capacity if said acceptable receive list contains at least one additional slot.

20. The method of claim 18, wherein said step of updating a current status further comprises:
causing said second node to remove said certain TDMA transmit slots and said certain TDMA receive slots by said second node;
sending an acknowledgement of removal of said certain TDMA transmit and TDMA receive slots from said second node to said first node; and
ceasing the use of said certain TDMA transmit slots and said certain TDMA receive slots by said first node and said second node.

* * * * *